United States Patent
Wampler et al.

(10) Patent No.: US 7,098,870 B2
(45) Date of Patent: Aug. 29, 2006

(54) ADVERTISING METHOD FOR DYNAMIC BILLBOARDS

(75) Inventors: James W. Wampler, Zephyrhills, FL (US); Scott D. Wampler, West Chester, OH (US); Jeffrey J. Vaitekunas, West Chester, OH (US)

(73) Assignee: NOVUS Partners LLC, Cincinnati, OH (US)

( * ) Notice: Subject to any disclaimer, the term of this patent is extended or adjusted under 35 U.S.C. 154(b) by 22 days.

(21) Appl. No.: 10/174,972

(22) Filed: Jun. 19, 2002

(65) Prior Publication Data

US 2003/0001796 A1   Jan. 2, 2003

Related U.S. Application Data

(60) Provisional application No. 60/302,118, filed on Jun. 29, 2001.

(51) Int. Cl.
G09G 5/00 (2006.01)

(52) U.S. Cl. .......................... 345/2.1; 715/744

(58) Field of Classification Search ............... 345/1.1, 345/1.2, 1.3, 3.4, 204, 205, 2.1; 715/735, 715/739, 744
See application file for complete search history.

(56) References Cited

U.S. PATENT DOCUMENTS

| | | | |
|---|---|---|---|
| 3,373,517 A | 3/1968 | Halperin |
| 3,376,465 A | 4/1968 | Corpew |
| 3,848,193 A | 11/1974 | Martin |
| 3,941,926 A | 3/1976 | Slobodzian |
| 3,983,317 A | 9/1976 | Glorioso |
| 3,993,955 A | 11/1976 | Belcher |
| 4,094,010 A | 6/1978 | Pepperl |
| 4,126,854 A | 11/1978 | Sheridan |
| 4,155,042 A | 5/1979 | Permut |
| 4,332,022 A | 5/1982 | Ceshkovsky |

(Continued)

FOREIGN PATENT DOCUMENTS

CA    2064855    3/1991

(Continued)

OTHER PUBLICATIONS

Gyricon, Maestroware web page and FAQ sheet Feb. 22, 2002; http://www.gyriconmedia.com.

(Continued)

*Primary Examiner*—Richard Hjerpe
*Assistant Examiner*—Jean Lesperance
(74) *Attorney, Agent, or Firm*—Frost Brown Todd LLC

(57) ABSTRACT

A method for billboard advertising is disclosed. An advertising billboard device for use with the present invention comprises a server and a display controller adapted to receive, store, and display dynamic-content from the server. At least one content display unit is in communication with the display controller, wherein the content display unit visually displays the information from the dynamic-content. The advertising billboard display controller may also comprise a timing means, the display controller altering the visual display of the content display unit as a function of the time from the timing means. The display controller may be adapted to receive, store, and display dynamic-content from a plurality of servers, wherein the display controller comprises a heirarchical control scheme, the heirarchical control scheme adapted to select dynamic-content from one server of the plurality of servers for display on the content display unit. The advertising billboard device may also comprise a plurality of display controllers in communication with a plurality of content display units, each display controller from the plurality of display controllers having a type identifier, wherein each of the display controllers selects dynamic-content for display on its content display unit as a function of the type identifier.

21 Claims, 3 Drawing Sheets

U.S. PATENT DOCUMENTS

| | | |
|---|---|---|
| 4,368,485 A | 1/1983 | Midland |
| 4,476,488 A | 10/1984 | Merrell |
| 4,536,791 A | 8/1985 | Campbell |
| 4,559,480 A | 12/1985 | Nobs |
| 4,575,750 A | 3/1986 | Callahan |
| 4,595,950 A | 6/1986 | Lofberg |
| 4,654,482 A | 3/1987 | DeAngelis |
| 4,716,410 A | 12/1987 | Nozaki |
| 4,734,779 A | 3/1988 | Levis |
| 4,734,858 A | 3/1988 | Schlafly |
| 4,761,641 A | 8/1988 | Schreiber |
| 4,797,913 A | 1/1989 | Kaplan |
| 4,812,843 A | 3/1989 | Champion, III |
| 4,829,569 A | 5/1989 | Seth-Smith |
| 4,847,825 A | 7/1989 | Levine |
| 4,862,268 A | 8/1989 | Campbell |
| 4,908,713 A | 3/1990 | Levine |
| 4,949,187 A | 8/1990 | Cohen |
| 5,046,090 A | 9/1991 | Walker |
| 5,051,822 A | 9/1991 | Rhoades |
| 5,073,925 A | 12/1991 | Nagata |
| 5,107,107 A | 4/1992 | Osborne |
| 5,121,430 A | 6/1992 | Ganzer |
| 5,123,046 A | 6/1992 | Levine |
| 5,133,079 A | 7/1992 | Ballantyne |
| 5,182,669 A | 1/1993 | Chikuma |
| 5,191,573 A | 3/1993 | Hair |
| 5,214,793 A | 5/1993 | Conway |
| 5,233,423 A | 8/1993 | Jernigan |
| 5,235,587 A | 8/1993 | Bearden |
| 5,251,193 A | 10/1993 | Nelson |
| 5,257,017 A | 10/1993 | Jones |
| 5,260,778 A | 11/1993 | Kauffman |
| 5,274,762 A | 12/1993 | Peterson |
| 5,283,731 A | 2/1994 | LaLonde |
| 5,297,204 A | 3/1994 | Levine |
| 5,311,423 A | 5/1994 | Clark |
| 5,319,735 A | 6/1994 | Preuss |
| 5,355,302 A | 10/1994 | Martin |
| 5,365,282 A | 11/1994 | Levine |
| 5,373,330 A | 12/1994 | Levine |
| 5,389,945 A | 2/1995 | Sheridan |
| 5,392,066 A | 2/1995 | Fisher |
| 5,414,756 A | 5/1995 | Levine |
| 5,418,713 A | 5/1995 | Allen |
| 5,420,647 A | 5/1995 | Levine |
| 5,420,923 A | 5/1995 | Beyers, II |
| 5,428,606 A | 6/1995 | Moskowitz |
| 5,465,291 A | 11/1995 | Barrus |
| 5,469,020 A | 11/1995 | Herrick |
| 5,473,584 A | 12/1995 | Oshima |
| 5,486,819 A | 1/1996 | Horie |
| 5,495,283 A | 2/1996 | Cowe |
| 5,497,186 A | 3/1996 | Kawasaki |
| 5,497,479 A | 3/1996 | Hornbuckle |
| 5,508,815 A | 4/1996 | Levine |
| 5,512,935 A | 4/1996 | Majeti |
| 5,513,260 A | 4/1996 | Ryan |
| 5,530,751 A | 6/1996 | Morris |
| 5,532,920 A | 7/1996 | Hartrick |
| 5,543,856 A | 8/1996 | Rosser |
| 5,557,541 A | 9/1996 | Schulhof |
| 5,559,549 A | 9/1996 | Hendricks |
| 5,565,909 A | 10/1996 | Thibadeau |
| 5,568,272 A | 10/1996 | Levine |
| 5,592,511 A | 1/1997 | Schoen |
| 5,592,551 A | 1/1997 | Lett |
| 5,592,626 A | 1/1997 | Papadimitriou |
| 5,600,839 A | 2/1997 | MacDonald |
| 5,604,027 A | 2/1997 | Sheridan |
| 5,612,741 A | 3/1997 | Loban |
| 5,619,247 A | 4/1997 | Russo |
| 5,621,863 A | 4/1997 | Boulet |
| 5,627,895 A | 5/1997 | Owaki |
| 5,628,050 A | 5/1997 | McGraw |
| 5,630,067 A | 5/1997 | Kindell |
| 5,638,113 A | 6/1997 | Lappington |
| 5,640,453 A | 6/1997 | Schuchman |
| 5,644,859 A | 7/1997 | Hsu |
| 5,646,603 A | 7/1997 | Nagata |
| 5,646,997 A | 7/1997 | Barton |
| 5,654,747 A | 8/1997 | Ottesen |
| 5,659,366 A | 8/1997 | Kerman |
| 5,659,613 A | 8/1997 | Copeland |
| 5,661,516 A | 8/1997 | Carles |
| 5,664,018 A | 9/1997 | Leighton |
| 5,675,734 A | 10/1997 | Hair |
| 5,684,918 A | 11/1997 | Abecassis |
| 5,686,954 A | 11/1997 | Yoshinobu |
| 5,689,799 A | 11/1997 | Dougherty |
| 5,692,214 A | 11/1997 | Levine |
| 5,701,161 A | 12/1997 | Williams |
| 5,701,383 A | 12/1997 | Russo |
| 5,701,397 A | 12/1997 | Steimle |
| 5,710,869 A | 1/1998 | Godefray |
| 5,717,814 A | 2/1998 | Abecassis |
| 5,717,832 A | 2/1998 | Steimle |
| 5,721,827 A | 2/1998 | Logan |
| 5,721,951 A | 2/1998 | DorEl |
| 5,724,062 A | 3/1998 | Hunter |
| 5,724,064 A | 3/1998 | Stefik |
| 5,724,091 A | 3/1998 | Freeman |
| 5,724,525 A | 3/1998 | Beyers, II |
| 5,729,214 A | 3/1998 | Moore |
| 5,734,413 A | 3/1998 | Lappington |
| 5,739,808 A | 4/1998 | Suga et al. |
| 5,740,326 A | 4/1998 | Boulet |
| 5,748,716 A | 5/1998 | Levine |
| 5,758,257 A | 5/1998 | Herz |
| 5,760,820 A | 6/1998 | Eda |
| 5,761,601 A | 6/1998 | Nemirofsky |
| 5,761,606 A | 6/1998 | Wolzien |
| 5,781,734 A | 7/1998 | Ohno |
| 5,790,202 A | 8/1998 | Kummer |
| 5,790,937 A | 8/1998 | Gutle |
| 5,793,343 A | 8/1998 | Hart |
| 5,799,285 A | 8/1998 | Klingman |
| 5,805,154 A | 9/1998 | Brown |
| 5,805,763 A | 9/1998 | Lawler |
| 5,809,139 A | 9/1998 | Girod |
| 5,818,806 A | 10/1998 | Wong |
| 5,822,432 A | 10/1998 | Moskowitz |
| 5,825,407 A | 10/1998 | Cowe |
| 5,826,123 A | 10/1998 | Lai |
| RE35,954 E | 11/1998 | Levine |
| 5,832,287 A | 11/1998 | Atalla |
| 5,835,896 A | 11/1998 | Fisher |
| 5,841,979 A | 11/1998 | Schulhof |
| 5,845,083 A | 12/1998 | Hamadani |
| 5,848,129 A | 12/1998 | Baker |
| 5,848,155 A | 12/1998 | Cox |
| 5,848,352 A | 12/1998 | Dougherty |
| 5,852,812 A | 12/1998 | Reeder |
| 5,854,779 A | 12/1998 | Johnson |
| 5,860,068 A | 1/1999 | Cook |
| 5,870,717 A | 2/1999 | Weicha |
| 5,874,985 A | 2/1999 | Matthews, III |
| 5,889,868 A | 3/1999 | Moskowitz |
| 5,890,136 A | 3/1999 | Kipp |
| 5,897,622 A | 4/1999 | Blinn |
| 5,898,384 A | 4/1999 | Alt |
| 5,899,980 A | 5/1999 | Wilf |
| 5,903,878 A | 5/1999 | Talati |
| 5,905,800 A | 5/1999 | Moskowitz |

| Patent No. | Date | Name | | Patent No. | Date | Name |
|---|---|---|---|---|---|---|
| 5,909,492 A | 6/1999 | Payne | | 6,232,950 B1 | 5/2001 | Albert |
| 5,913,039 A | 6/1999 | Nakamura et al. | | 6,233,389 B1 | 5/2001 | Barton |
| 5,915,027 A | 6/1999 | Cox | | 6,233,682 B1 | 5/2001 | Fritsch |
| 5,915,068 A | 6/1999 | Levine | | 6,240,401 B1 | 5/2001 | Oren |
| 5,918,213 A | 6/1999 | Bernard | | 6,249,332 B1 | 6/2001 | Bryan-Brown |
| 5,930,026 A | 7/1999 | Jacobson | | 6,252,522 B1 | 6/2001 | Hampton |
| 5,930,369 A | 7/1999 | Cox | | 6,253,189 B1 | 6/2001 | Feezell |
| 5,933,798 A | 8/1999 | Linnartz | | 6,266,442 B1 | 7/2001 | Laumeyer et al. |
| 5,934,795 A | 8/1999 | Rykowski | | 6,285,984 B1 | 9/2001 | Speicher |
| 5,937,392 A | 8/1999 | Alberts | | 6,294,284 B1 * | 9/2001 | Lynch et al. ............ 429/90 |
| 5,940,135 A | 8/1999 | Petrovic | | 6,396,205 B1 * | 5/2002 | Sprague ............ 313/477 R |
| 5,940,807 A | 8/1999 | Purcell | | 6,408,278 B1 | 6/2002 | Carney |
| 5,943,670 A | 8/1999 | Prager | | 6,424,845 B1 | 7/2002 | Emmoft |
| 5,946,665 A | 8/1999 | Suzuki | | 6,424,998 B1 | 7/2002 | Hunter |
| 5,949,885 A | 9/1999 | Leighton | | 6,429,812 B1 | 8/2002 | Hoffberg |
| 5,955,710 A | 9/1999 | DiFranza | | 6,430,603 B1 * | 8/2002 | Hunter ............ 709/207 |
| 5,959,945 A | 9/1999 | Klieman | | 6,430,605 B1 | 8/2002 | Hunter |
| 5,960,081 A | 9/1999 | Vynne | | 6,434,479 B1 * | 8/2002 | Kondou et al. ........ 701/203 |
| 5,960,411 A | 9/1999 | Hartman | | 6,442,529 B1 | 8/2002 | Krishan |
| 5,961,804 A | 10/1999 | Jacobson | | 6,446,045 B1 | 9/2002 | Stone |
| 5,963,264 A | 10/1999 | Jackson | | 6,473,072 B1 | 10/2002 | Comiskey |
| 5,963,915 A | 10/1999 | Kirsch | | 6,538,801 B1 | 3/2003 | Jacobson et al. |
| 5,963,917 A | 10/1999 | Ogram | | 6,539,417 B1 | 3/2003 | Stern |
| 5,966,440 A | 10/1999 | Hair | | 6,553,404 B1 | 4/2003 | Stern |
| 5,966,696 A | 10/1999 | Giraud | | 6,560,649 B1 | 5/2003 | Mullen |
| 5,966,697 A | 10/1999 | Fergerson | | 6,571,279 B1 | 5/2003 | Herz |
| 5,969,283 A | 10/1999 | Looney | | 6,573,880 B1 | 6/2003 | Simoni et al. |
| 5,969,715 A | 10/1999 | Dougherty | | 6,591,247 B1 | 7/2003 | Stern |
| 5,970,471 A | 10/1999 | Hill | | 6,622,142 B1 * | 9/2003 | Murray et al. .......... 707/100 |
| 5,970,472 A | 10/1999 | Alsop | | 6,639,608 B1 | 10/2003 | Itakura |
| 5,970,473 A | 10/1999 | Gerzberg | | 6,654,757 B1 | 11/2003 | Stern |
| 5,970,474 A | 10/1999 | LeRoy | | 6,701,143 B1 | 3/2004 | Dukach |
| 5,970,475 A | 10/1999 | Barnes | | 6,753,830 B1 | 6/2004 | Gelbman |
| 5,974,396 A | 10/1999 | Anderson | | 6,754,636 B1 | 6/2004 | Walker et al. |
| 5,978,775 A | 11/1999 | Chen | | 6,864,875 B1 | 3/2005 | Drzaic et al. |
| 5,983,199 A | 11/1999 | Kaneko | | 2001/0002852 A1 | 6/2001 | Kwoh |
| 5,983,200 A | 11/1999 | Slotznick | | 2001/0003846 A1 | 6/2001 | Rowe |
| 5,983,201 A | 11/1999 | Fay | | 2001/0005906 A1 | 6/2001 | Humpleman |
| 5,988,078 A | 11/1999 | Levine | | 2001/0010045 A1 | 7/2001 | Stefik |
| 5,991,737 A | 11/1999 | Chen | | 2001/0010095 A1 | 7/2001 | Ellis |
| 5,992,888 A | 11/1999 | North | | 2001/0013037 A1 | 8/2001 | Matsumoto |
| 6,002,772 A | 12/1999 | Saito | | 2001/0013120 A1 | 8/2001 | Tsukamoto |
| 6,013,007 A | 1/2000 | Root | | 2001/0014882 A1 | 8/2001 | Stefik |
| 6,014,247 A | 1/2000 | Winter | | 2001/0016836 A1 | 8/2001 | Boccon Gibod |
| 6,014,491 A | 1/2000 | Hair | | 2001/0017920 A1 | 8/2001 | Son |
| 6,025,868 A | 2/2000 | Russo | | 2001/0018742 A1 | 8/2001 | Hirai |
| 6,026,375 A | 2/2000 | Hall | | 2001/0018858 A1 | 9/2001 | Dwek |
| 6,029,141 A | 2/2000 | Bezos | | 2001/0023416 A1 | 9/2001 | Hosokawa |
| 6,052,554 A | 4/2000 | Hendricks | | 2001/0023417 A1 | 9/2001 | Stefik |
| 6,058,417 A | 5/2000 | Hess | | 2001/0023428 A1 | 9/2001 | Miyazaki |
| 6,060,993 A | 5/2000 | Cohen | | 2001/0024425 A1 | 9/2001 | Tsunoda |
| 6,065,969 A * | 5/2000 | Rifkin et al. ............ 434/100 | | 2001/0024566 A1 | 9/2001 | Mankowitz |
| 6,067,107 A | 5/2000 | Travaille | | 2001/0025259 A1 | 9/2001 | Rouchon |
| 6,067,185 A | 5/2000 | Albert | | 2001/0025269 A1 | 9/2001 | Otsuka |
| 6,067,532 A | 5/2000 | Gebb | | 2001/0025316 A1 | 9/2001 | Oh |
| 6,073,372 A | 6/2000 | Davis | | 2001/0027561 A1 | 10/2001 | White |
| 6,091,883 A | 7/2000 | Artigalas | | 2001/0027563 A1 | 10/2001 | White |
| 6,115,348 A | 9/2000 | Guerra | | 2001/0029491 A1 | 10/2001 | Yonetta |
| 6,120,588 A | 9/2000 | Jacobson | | 2001/0029538 A1 | 10/2001 | Blockton |
| 6,124,851 A | 9/2000 | Jacobson | | 2001/0029583 A1 | 10/2001 | Palatov |
| 6,130,773 A | 10/2000 | Jacobson | | 2001/0030660 A1 | 10/2001 | Zainouiline |
| 6,141,530 A | 10/2000 | Rabowsky | | 2001/0031066 A1 | 10/2001 | Meyer |
| 6,148,142 A | 11/2000 | Anderson | | 2001/0032131 A1 | 10/2001 | Mowry |
| 6,148,428 A | 11/2000 | Welch | | 2001/0032132 A1 | 10/2001 | Moran |
| 6,150,964 A | 11/2000 | McLaughlin | | 2001/0032133 A1 | 10/2001 | Moran |
| 6,154,220 A | 11/2000 | Prakriya et al. | | 2001/0032187 A1 | 10/2001 | Nuttall |
| 6,157,396 A | 12/2000 | Margulis et al. | | 2001/0032312 A1 | 10/2001 | Runje |
| 6,167,358 A | 12/2000 | Othmer et al. | | 2001/0034635 A1 | 10/2001 | Winters |
| 6,172,798 B1 | 1/2001 | Albert et al. | | 2001/0034714 A1 | 10/2001 | Terao |
| 6,177,921 B1 | 1/2001 | Comiskey | | 2001/0034883 A1 | 10/2001 | Zigmond |
| 6,215,411 B1 | 4/2001 | Gothard | | 2002/0055880 A1* | 5/2002 | Unold et al. ............ 705/26 |
| 6,221,267 B1 | 4/2001 | Ikeda | | 2002/0087335 A1 | 7/2002 | Meyers et al. |
| 6,223,027 B1 | 4/2001 | Ono | | 2002/0091738 A1* | 7/2002 | Rohrabaugh et al. |

| | | | |
|---|---|---|---|
| 2002/0097193 A1 | 7/2002 | Powers | |
| 2002/0099533 A1 | 7/2002 | Jaqua | |
| 2002/0165776 A1 | 11/2002 | Hunter | |
| 2003/0001796 A1 | 1/2003 | Wampler et al. | |
| 2003/0001830 A1 | 1/2003 | Wampler et al. | |
| 2003/0004805 A1 | 1/2003 | Vaitekunas et al. | |
| 2003/0004806 A1 | 1/2003 | Vaitekunas | |
| 2003/0061353 A1* | 3/2003 | Johnson et al. | 709/226 |
| 2004/0036622 A1 | 2/2004 | Dukach et al. | |

FOREIGN PATENT DOCUMENTS

| | | |
|---|---|---|
| CA | 2189454 | 11/1995 |
| CA | 2231376 | 3/1997 |
| EP | 0683943 B1 | 11/1993 |
| EP | 0954176 A2 | 11/1999 |
| EP | 0954179 A2 | 11/1999 |
| EP | 0975111 A2 | 1/2000 |
| EP | 0977389 A2 | 2/2000 |
| EP | 0984631 A1 | 3/2000 |
| EP | 0994470 A2 | 4/2000 |
| EP | 1104195 A2 | 5/2001 |
| EP | 1143721 A1 | 10/2001 |
| EP | 1244303 A2 | 9/2002 |
| WO | WO 91/03112 | 3/1991 |
| WO | WO 95/12282 | 5/1995 |
| WO | WO 96/34467 | 10/1996 |
| WO | WO 96/34494 | 10/1996 |
| WO | WO 96/26605 | 11/1996 |
| WO | PCT-US00-05436 | 3/1999 |
| WO | PCT-US99-06632 | 3/1999 |
| WO | WO 99/18727 | 4/1999 |
| WO | PCT-US98-00404 | 7/1999 |
| WO | WO 00/07368 | 2/2000 |
| WO | WO 00/52934 | 9/2000 |
| WO | WO 00/52935 | 9/2000 |
| WO | WO 00/65576 | 11/2000 |
| WO | WO 01/41013 | 6/2001 |
| WO | WO 01/47249 | 6/2001 |

OTHER PUBLICATIONS

Gregory P. Crawford, A bright new page in portable displays, IEEE Spectrum, pp. 40-46, Oct. 2000 USA.

International Search Report, dated Mar. 2, 2004 for PCT Application No. PCT/US02/19459.

International Search Report, dated Oct. 26, 2000 for PCT Application No. PCT/US00/11022.

International Search Report, dated Oct. 18, 2004 for PCT Application No. PCT/US04/011186.

Written Opinion, dated Oct. 18, 2004 for PCT Application No. PCT/US04/011186.

Observations, dated Jun. 2, 2003, filed against European Patent Application No. 00928351.6.

(Author unknown); "Scheduling InfoChannel Events," "Using ScalaNet," and "Additional InfoChannel EXes"; pp. 6-76; dated Jul. 23, 1996; (publisher unknown); (country of publication unknown).

Carol Hildebrand; "Movie Technology Puts an End to Bad Endings"; from Computerworld; (undated); (publisher unkown); (country of publication unknown).

James Daly; "Quiet on the Set! Lights, Camera, Digitize"; from Computerworld; (undated); (publisher unknown); (country of publication unknown).

Zimmermann et al.; "Bergens Tidene: A Small Revolution"; dated Jul. 24, 1998; (publisher unknown); (country of publication unknown).

(Author unknown); "Digital Programe Delivery: Digital Cinema"; dated Oct. 18, 2002; (publisher unknown); (country of publication unknown).

Jim Mendrala; "A Brief History of Film and Cinema"; dated Jul. 1, 2002; (publisher unknown); (country of publication unknown).

Dean Takahashi; "Pac Bell Plans New Way to Get Films Into Theaters"; from The Los Angeles Times; dated Apr. 28, 1992; Los Angeles Times; U.S.

(Author unknown); "E Cinema—Main Report"; (undated); (publisher unknown); (country of publication unknown).

Kjetil Jørgensen; "Dagens Næringsliv: CAPA Enters New Advertising Channel"; dated Aug. 5, 1998; (publisher unknown); (country of publication unknown).

David Griffiths; "Regarding: Update on Offer from Christie Digital Systems Inc."; dated Dec. 15, 1999; Christie Digital Systems Inc.; United Kingdom.

Patrick Von Sychowski; "Screen Digest's E-Cinema Alert #85"; dated Oct. 4, 2002; Screen Digest; (country of publication unknown).

Patrick Von Sychowski; "Screen Digest's E-Cinema Alert #86"; dated Oct. 14, 2002; Screen Digest; (country of publication unknown).

(Author unknown); "Kontrakt"; dated Feb. 11, 1998; (publisher unknown); (country of publication unknown).

(Author unknown); "Kontrakt"; dated Mar. 17, 1999; (publisher unknown); (country of publication unknown).

Steven A. Morley; "Making Digital Cinema Actually Happen—What It Takes and Who's Going to Do It"; dated Oct. 31, 1998; Qualcomm Incorporated; U.S.

David J. Fox; "Pacific Bell Unveils a New Way of Looking at Movies Technology: A High-Definition Digital Projection Sent Over Fiber-Optic Telephone Lines Would Eliminate Film"; from The Los Angeles Times; dated Nov. 2, 1993; Los Angeles Times; U.S.

Office Action dated Sep. 8, 2004 for U.S. Appl. No. 10/175,057, filed Jun. 19, 2002.

Office Action dated Apr. 10, 2001 for U.S. Appl. No. 09/416,333, filed Oct. 12, 1999.

Office Action dated Jul. 18, 2000 for U.S. Appl. No. 09/416,333, filed Oct. 12, 1999.

Office Action dated Jul. 18, 2000 for U.S. Appl. No. 09/315,111, filed May 18, 1999.

Office Action dated Apr. 10, 2001 for U.S. Appl. No. 09/315,111, filed May 18, 1999.

Office Action dated Jul. 18, 2000 for U.S. Appl. No. 09/301,102, filed Apr. 28, 1999.

Office Action dated Apr. 10, 2001 for U.S. Appl. 09/301,102, filed Apr. 28, 1999.

Office Action dated Mar. 17, 2003 for U.S. Appl. 09/465,730, filed May 17, 2000.

Office Action dated Apr. 27, 2004 for U.S. Appl. No. 09/465,730, filed May 17, 2000.

English translation of Office Action dated Feb. 1, 2005 for JP Application No. 2000-614441, filed Oct. 29, 2001.

Office Action dated Apr. 9, 2004 for U.S. Appl. No. 10/133,343, filed Apr. 29, 2002.

Office Action dated May 27, 2004 for U.S. Appl. No. 10/133,733, filed Apr. 29, 2002.

Office Action dated May 19, 2005 for Israeli Application No. 146,160, filed Oct. 25, 2001 (with partial English translation).

Office Action dated Jun. 1, 2004 for Canadian Application No. 2,371,293, filed Apr. 24, 2000.

Office Action dated Feb. 23, 2005 for Canadian Application No. 2,371,293, filed Apr. 24, 2000.

Office Action dated Oct. 6, 2003 for U.S. Appl. No. 10/133,343, filed Apr. 29, 2002.

Office Action dated Jan. 7, 2005 for U.S. Appl. No. 10/133,343, filed Apr. 29, 2002.

Office Action dated May 2, 2003 for U.S. Appl. No. 10/412,539, filed Apr. 11, 2003.

Office Action dated Feb. 23, 2005 for U.S. Appl. No. 10/174,231, filed Jun. 19, 2002.

Office Action dated Mar. 26, 2004 for U.S. Appl. No. 10/174,231, filed Jun. 19, 2002.

Office Action dated Sep. 27, 2004 for U.S. Appl. No. 10/444,079, filed May 23, 2003.

Office Action dated Aug. 19, 2003 for U.S. Appl. No. 10/133,733, filed Apr. 29, 2002.

Office Action dated Jan. 21, 2005, for U.S. Appl. No. 10/133,733, filed Apr. 29, 2002.

Office Action dated Aug. 9, 2005 for U.S. Appl. No. 10/174,231, filed Jun. 19, 2002.
Office Action dated May 2, 2005 for U.S. Appl. No. 10/412,539, filed Apr. 11, 2003.
Office Action dated Aug. 15, 2005 for U.S. Appl. No. 10/412,539, filed Apr. 11, 2003.
Office Action dated Jul. 26, 2005 for U.S. Appl. No. 10/422,331, filed Apr. 24, 2003.
Office Action dated Jul. 7, 2005 for U.S. Appl. No. 10/175,057, filed Jun. 19, 2002.
Office Action dated Feb. 28, 2005 for U.S. Appl. No. 09/465,730, filed May 17, 2000.
Karen J. Bannan; "How It Works; Streaming Onto the Movie Screen, With Nary a Scratch"; The New York Times; p. E5; May 9, 2002.
Office Action dated Sep. 9, 2005 for U.S. Appl. No. 10/133,733, filed Apr. 29, 2002.
From http://www.archives.net, a history of Internet operation of eBay.com and amazon.com.
From http://www.amazon.com, amazon.com, Inc. practices of merchandising products & contacts between sellers and buyers.
From http://www.eBay.com, eBay.com practices of merchandising products & contacts between sellers and buyers.
"Universal Product Code (UPC) and EAN Article Numbering Code (EAN) Page," http://www.adams1.com/pub/russadam/upccode.html, by Russ Adams.
"DataPlay, Inc.—Universal Recording Media—Discover," http://www.dataplay.com/jsp_files/en/discover/index-music.jsp, downloaded and printed on May 14, 2002, (Copyright 2001).
"DataPlay, Inc.—Universal Recording Media—What's Playing on DataPlay," http://www.dataplay.com/servlets/ProductList?action=productSearch, downloaded and printed on May 14, 2002, (Copyright 2001).
"DataPlay, Inc.—Universal Recording Media—What's Playing on DataPlay," http://www.dataplay.com/jsp_files/en/whatsplaying/products.jsp, downloaded and printed on May 14, 2002, (Copyright 2001).
"DataPlay, Inc.—Universal Recording Media—What's Playing on DataPlay," http://www.dataplay.com/jsp_files/en/whatsplaying/products.jsp?action=details, downloaded and printed on May 14, 2002, (Copyright 2001).
"DataPlay, Inc.—Universal Recording Media—Industry," http://www.dataplay.com/jsp_files/en/industry/products-digitalmedia.jsp, downloaded and printed on May 14, 2002, (Copyright 2001).
"DataPlay, Inc.—Universal Recording Media—Industry," http://www.dataplay.com/jsp_files/en/industry/products-engines.jsp, downloaded and printed on May 14, 2002, (Copyright 2001).
"DataPlay, Inc.—Universal Recording Media—Industry," http://www.dataplay.com/jsp_files/en/industry/contentproviders.jsp, downloaded and printed on May 14, 2002, (Copyright 2001).
"DataPlay, Inc.—Universal Recording Media—Industry," http://www.dataplay.com/jsp_files/en/industry/products-contentkey.jsp, downloaded and printed on May 14, 2002, (Copyright 2001).
"DataPlay, Inc.—Universal Recording Media—Industry," http://www.dataplay.com/jsp_files/en/industry/index.jsp, downloaded and printed on May 14, 2002, (Copyright 2001).
"What's Playing on DataPlay—Everything Digital," DataPlay Micro-optical Engine Product Brochure, downloaded and printed on May 14, 2002, (Copyright 2001).
"What's Playing on DataPlay—Everything Digital," DataPlay Digital Media Product Brochure, downloaded and printed on May 14, 2002, (Copyright 2000-2001).
"Calimetrics' Multilevel Technology Enables Higher-Performance CD/DVD Recorders: An IDC White Paper," Wolfgang Schlichting, (Copyright 2000).
"Wink Television Press Room," http://www.wink.com/contents/PressReleases.shtml, downloaded and printed May 14, 2002.
"Wink Announces First National Advertising Partners: AT&T, Levi Strauss & Co., and GE," http://www.wink.com/contents/PressReleases/930708938.shtml, downloaded and printed on May 14, 2002, dated Sep. 9, 1998.
"Wink Communications, Inc. Changes the Advertising Landscape," http://www.wink.com/contents/PressReleases/930709807.shtml, downloaded and printed on May 14, 2002, dated Jan. 21, 1999.
"Wink's History," http://www.wink.com/contents/history.shtml, downloaded and printed on May 14, 2002.
"How Wink Works," http://www.wink.com/contents/howitworks.shtml, downloaded and printed on May 14, 2002.
"What is Wink: Examples," http://www.wink.com/contents/examples.shtml, downloaded and printed on May 14, 2002.
"The Wink System," http://www.wink.com/contents/tech_diagram.shtml, downloaded and printed on May 14, 2002.
"Wink Response Server and Wink Response Network," http://www.wink.com/contents/tech_wrs.shtml, downloaded and printed on May 14, 2002.
"ICAP and HTML (ATVEF)," http://www.wink.com/contents/tech_icap.shtml, downloaded and printed on May 14, 2002.
"Wink Studio and Wink Server Studio," http://www.wink.com/contents/tech_studio.shtml, downloaded and printed on May 14, 2002.
"Wink Broadcast Server," http://www.wink.com/contents/tech_wbs.shtml, downloaded and printed on May 14, 2002.
"Wink Client Software," http://www.wink.com/contents/tech_engine.shtml, downloaded and printed on May 14, 2002.
"Onsale Invoice," http://www.onsale.com/cgi-win/invoice.exe, dated Jan. 19, 1998, printed on Jan. 20, 1998, (Copyright 1997).
Onsale Packing Sheet (Jason Deep Space Series 225×60 Astronomy Telescope), received Jul. 1999.
Egghead Packing Receipt (Franklin Rex Organizer), received Dec. 1999.
"Sell Goods to Egghead.com," http://www.egghead.com/ShowPage.dll?page=hd_aboutus_sellgoods_p, printed Sep. 29, 2001.
"Demographics Profile," http://www.egghead.com/ShowPage.dll?page=hd_aboutus_demo_p, printed Sep. 29, 2001.
"About us," http://www.egghead.com/ShowPage.dll?page=hd_aboutus_aboutus_p, printed Sep. 29, 2001.
"Privacy and Security Policy," http://www.egghead.com/ShowPage.dll?page=hd_policy_policyandprivacy_p, printed Sep. 29, 2001.
"Registration," http://www.egghead.com/ShowPage.dll?page=reg_page1_ceos&S=1, printed Sep. 26, 2001.
"New Credit Information," https://secure.fairmarket.com/secure/Cre . . . FM1001, printed Sep. 26, 2001.
"Quadrant 256MB, PC133 (PC-100 Compatible), 32×54, 7ns, 168-pin, SdRAM DIMM Module (N21)," wysiwyg://253/http://auctions.egghead.com . . . LotNo=65659811&BatchNo=0, printed Sep. 24, 2001.
"Ashton Digital VisionGate 52 15.1' TFT-LCD, Pivot Screen USB Hub, w/Speakers," wysiwyg://253/http://auctions.egghead.com . . . LotNo=66044439, printed Sep. 26, 2001.
"Login/Logout," http://www.egghead.com/ShowPage.dll?page . . . 44439, printed Sep. 29, 2001.
"Enter Your Bid," wysiwyg://218/http://auctions.egghead.com . . . 5a99, printed Sep. 29, 2001.
"Enter Your Bid," https://auctions.egghead.com/scripts/ . . . LotNo=66044439, printed Sep. 29, 2001.
"Confirm Your Bid," wysiwyg://220/http://auctions.egghead.com . . . ShipCountry=US, printed Sep. 29, 2001.
"Bid Receipt for Bid No. 5270411," wysiwyg://220/http://auctions.egghead.com . . . KioskListing=0, printed Sep. 29, 2001.
Office Action dated Oct. 11, 2005 for U.S. Appl. No. 10/133,343, filed Apr. 29, 2002.
US 5,825,354, 10/1998, Ahmad (withdrawn)

* cited by examiner

ABSTRACT

ADVERTISING METHOD FOR DYNAMIC BILLBOARDS

This application is related to, and claims the benefit of, U.S. provisional application Ser. No. 60/302,118 filed Jun. 29, 2001.

FIELD OF THE INVENTION

The present invention relates, in general, to advertising methods for billboard devices and, more particularly, to advertising methods for billboards capable of dynamic-content display.

BACKGROUND OF THE INVENTION

Billboards are used to display various messages typically consisting of a combination of text and graphics. Traditionally, the message has been provided by way of fixed sheets that are pasted to a backing. This traditional approach suffers from the inability to quickly change the displayed message since it requires the use of a crew to change the message. Electronic billboards provide the advantage in that it is easier to change the displayed message. Electronic billboards include the dot matrix type utilizing many individual bulbs. Within stadiums, arenas and auditoriums there presently are electronic dot matrix display devices used for instant replays, advertising and customer information. While these electronic billboards are easily changed, they are difficult to manage and often require significant support resources to coordinate billboard content.

Loban et al. disclose a video billboard including a remote computer control with radio communications to the billboard display in U.S. Pat. No. 5,612,741 ('741). The '741 patent discloses that display information is communicated from a master computer to a receiver in the billboard housing which, in turn, controls the light valve display of the '741 invention. Commands may also be communicated via shared or dedicated landlines. The '741 billboard is capable of providing complex video graphics with high contrast ratios. It can provide message changes on command through landline, cellular phone, satellite relay or other wireless communication links. Within the commercial advertising billboard industry it will allow the use of computer video control to change graphics easily and quickly, as desired. Advertisements, public service announcements or traffic conditions can be displayed in near real time from remote locations since images can be downloaded via the communication links and displayed at pre-programmed time slots, if desired.

Gofman et al. disclose a system and method for serving local and global media content in PCT publication WO 00/52935 ('52935). The '52935 publication discloses a system and method for combining broadcast media content with additional content at a local site according to at least one locally determined characteristic of the audience to which the combined content is served. The '52935 publication discloses a template containing information concerning the type of data objects to be displayed, their size and location on the display, as well as the timing of display and transitions to the display, such that the template describes how to process and display the data.

New display materials are being developed that have the potential to expand advertising billboard technology, such as, for example, GYRICON a trade name of Xerox Corporation, Palo Alto Research Center, Palo Alto Calif. These new materials have the potential to expand the capabilities of billboard displays. Another new material for displays is E-INK, a trade name of E Ink Corporation 733 Concord Avenue, Cambridge, Mass. GYRICON technology is disclosed, for example, in U.S. Pat. No. 4,126,854. E-INK technology is disclosed, for example, in U.S. Pat. No. 6,120,588.

Although significant improvements are expanding the capabilities of billboard displays, as the capabilities expand the effort necessary to control the displays is expanding concurrently. It would therefore be advantageous to provide an improved method of billboard advertising that reduces the effort necessary to manage dynamic billboard displays. It would further be advantageous to provide an advertising device that easily controls multiple combinations of content display units. It would also be advantageous to provide easily manageable dynamic-content display. It would further be advantageous to provide a system capable of time shared display output from a heirarchical control structure.

SUMMARY OF THE INVENTION

A method for billboard advertising is disclosed. An advertising billboard device for use with the present invention comprises a display controller adapted to receive, and display dynamic-content. At least one content display unit is in communication with the display controller, wherein the content display unit visually displays the information from the dynamic-content. The advertising billboard display controller may also comprise a timing means, the display controller altering the visual display of the content display unit as a function of a signal from the timing means. The display controller may be adapted to receive, store, and display dynamic-content from a plurality of servers, wherein the display controller comprises a hierarchical control scheme, the hierarchical control scheme adapted to select dynamic-content from one server of the plurality of servers for display on the content display unit. The advertising billboard device may also comprise a plurality of display controllers in communication with a plurality of content display unit devices, each display controller from the plurality of display controllers having a type identifier, wherein each of the display controllers selects dynamic-content for display on its content display unit as a function of the type identifier. An advertising system in accordance with the present invention may also include a camera located in viewing proximity to the content display unit, capable of providing an image of the content display unit.

A method for billboard advertising in accordance with the present invention may include some or all of the following steps:

A) providing an advertising system, wherein the advertising system comprises:
  at least one server;
  at least one display controller, wherein the display controller is adapted to receive, store, and display dynamic-content from the server; and
  at least one content display unit in communication with the display controller, wherein the content display unit visually displays the information from the dynamic-content;
B) receiving advertising information from an advertiser;
C) communicating the advertising information as dynamic-content from the server to the display controller;
D) displaying the advertising information on the content display unit. In step D, the displaying step may be divided into a plurality of time segments, allowing the step of:

displaying a first advertisement during a first time segment and displaying a second advertisement during a second time segment.

E) segmenting a plurality of content display units into a plurality of groups, each group from the plurality of groups identified with a characteristic;

F) selecting a group from the plurality of groups to display dynamic-content on the plurality of content display units having the group characteristic.

In step A, a plurality of servers may be provided, and the method may further comprise:

G) selecting a hierarchy, the hierarchy defining a prioritization of the plurality of servers to at least one of the display controllers such that the display controller selects one server from the plurality of servers.

BRIEF DESCRIPTION OF THE DRAWINGS

The novel features of the invention are set forth with particularity in the appended claims. The invention itself, however, both as to organization and methods of operation, together with further objects and advantages thereof, may best be understood by reference to the following description, taken in conjunction with the accompanying drawings in which:

DETAILED DESCRIPTION OF THE INVENTION

The present invention relates, in general, to advertising methods for billboard devices and, more particularly, to advertising methods for billboards capable of dynamic-content display.

Content-display units are herein defined to include any visual display or portion of display capable of displaying information from dynamic-content such as, for example, video billboards, GYRICON, E-Ink, computer monitors, shopping mall kiosks, stadium displays, personal digital assistants, movie-theater screens, video projectors, and cellular phone displays. Content display units are divided into two types, active content-display units and passive content-display units. Active content-display units are displays that only display dynamic-content when they are actively being addressed or written on, such as, for example, computer monitors, movie-theater screens, and L.E.D. displays. Passive content-display units are displays that, when not being actively written to or addressed, retain a viewable image such as, for example, GYRICON and E-INK.

A suitable material for a passive content-display media would be, for example, SMARTPAPER (Trademark of Gyricon Inc. Palo Alto, Calif.) technology using an array of tiny (100 micron diameter or smaller) solid beads with one hemisphere of each bead one color (e.g. white) and the other a different color (e.g. black). These beads are embedded in a flexible plastic sheet in small cavities surrounded by a liquid. Each bead carries an electrical charge. When an external electric field is applied the bead rotates or gyrates. Adhesive forces between each bead and cavity wall require an electrical threshold be exceeded before it will rotate. This makes an image electrically "printed" onto the material stable and unchanging until "erased" by another transmission. Electrical signals can be applied to the SMARTPAPER sheets through fixed surface electrodes or a moving stylus. A networked programmable sign will run for up to 2 years on 3 AA batteries, with the power almost completely used by the communications and processing systems. SMARTPAPER itself requires just a capacitance or voltage (about 100 volts), not a power current. Unlike other types of electronic displays, SMARTPAPER has a wide viewing angle identical to traditional printed signs. This allows SMARTPAPER to be viewed like paper, from all angles and without added backlighting. Images can currently be displayed on SMARTPAPER with resolution over 100 dpi. Applying electrical fields to the display surface changes the image on SMARTPAPER. For purposes herein, GYRICON and SMARTPAPER are synonymous.

Dynamic-content is herein defined as information or data to be visually displayed that is updatable or changeable by electronic control such as, for example, pixel data from a digitized image, analog beam modulation information for a cathode ray tube (CRT), streaming video over a network, and ASCII character codes.

Figure 1:
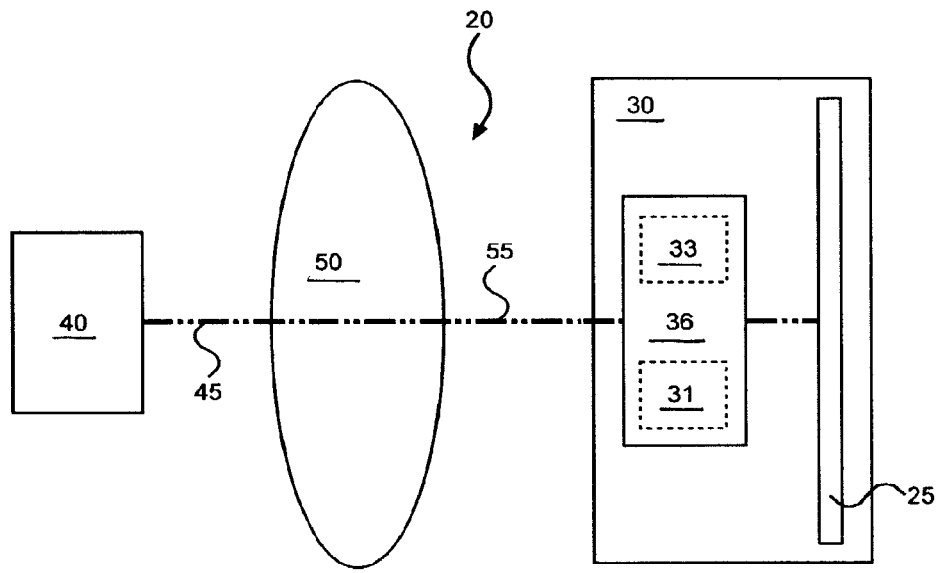
FIG. 1 is a block diagram of an advertising billboard system in accordance with the present invention.

FIG. 1 is a block diagram of an advertising billboard system 20 in accordance with the present invention. Advertising billboard system 20 comprises a server 40 and a display controller 30 adapted to receive, store, and display a dynamic-content from the server 40. Display controller 30 includes at least one content display unit 25, a receiver 36, storage means 33, and may include a timing means 31. Dynamic-content is transmitted from server 40 on a transmission path 45, through transmission media 50, and on receiving path 55 to display controller 30. Transmission path 45, transmission media 50, and receiving path 55 may be any one or combination of data transfer such as, for example, telephone wire, internet link, radio communication, cellular telephony, microwave link, local area network, and satellite broadcast. Receiver 36 receives the dynamic-content where it is either stored in storage means 33, or displayed on content display unit 25. Storage means 33 may be, for example, dynamic RAM in a computer, video tape, display memory, and computer hard disk.

The content display unit 25 visually displays the information from the dynamic-content. The timing means 31 may be, for example, a clock, a Global Positioning System (GPS), timing trigger, or other means of detecting a timing event. The display controller 30 alters the visual display of the content display unit 25 as a function of the time or position from the timing means 31. For example, if content display unit 25 is located near a commuter highway visible to commuters, it may be desirable to display a first message on content display unit 25 during commuter rush hours, and to display a second different message on content display unit 25 at other times.

Content-display unit 25 may be located, for example, on the side of a semi-trailer travelling over the road within a city. It may be desirable to display a first message whenever the semi-trailer is within a defined area, and a second message whenever the semi-trailer is outside of a defined area. It is contemplated that, for example, within the boundaries of an acceptable travelling range a first message could indicate trailer contents, and outside the acceptable travelling range a second message could indicate that the trailer should be stopped. As a second example, whenever a trailer having a content-display unit 25 is within a defined distance from "JOE's", it may be desirable to display "EAT at JOE's" on display unit 25.

Figure 2:
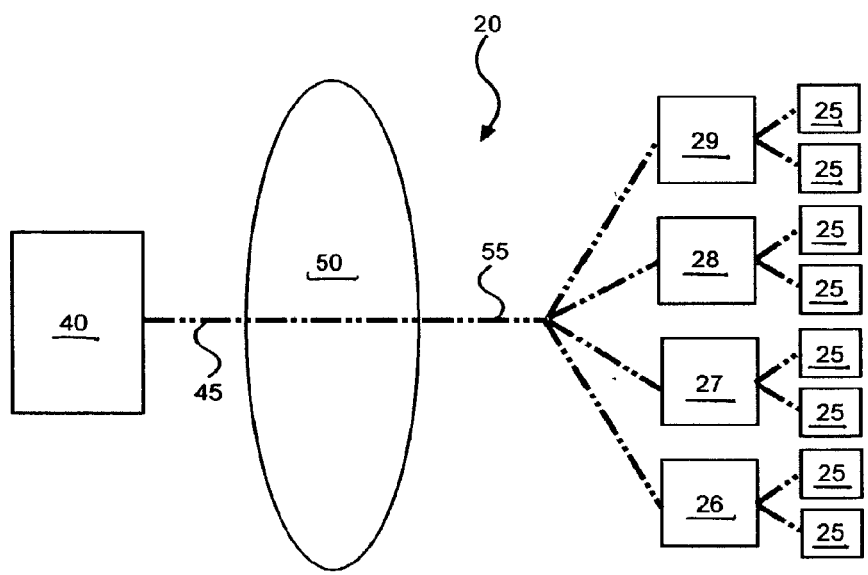
FIG. 2 is a block diagram of an advertising billboard system including a plurality of content display units in accordance with the present invention.

FIG. 2 is a block diagram of advertising billboard system 20 including a plurality of content display units 25 in accordance with the present invention. The advertising billboard system 20 may also comprise a plurality of display controllers 26, 27, 28, 29 in communication with a plurality of content display units 25, each one from the plurality of display controllers 26, 27, 28, 29 having a type identifier, wherein each of the display controllers 26, 27, 28, 29 selects dynamic-content for display on its content display unit 25 as a function of its type identifier. For example, display controller 26 may have a type identifier of highway billboard, display controller 27 may have a type identifier of shopping mall kiosk, display controller 28 may have a type identifier of computer monitors on a local area network, and display controller 29 may have a type identifier of an individuals cell phone display.

Figure 3:
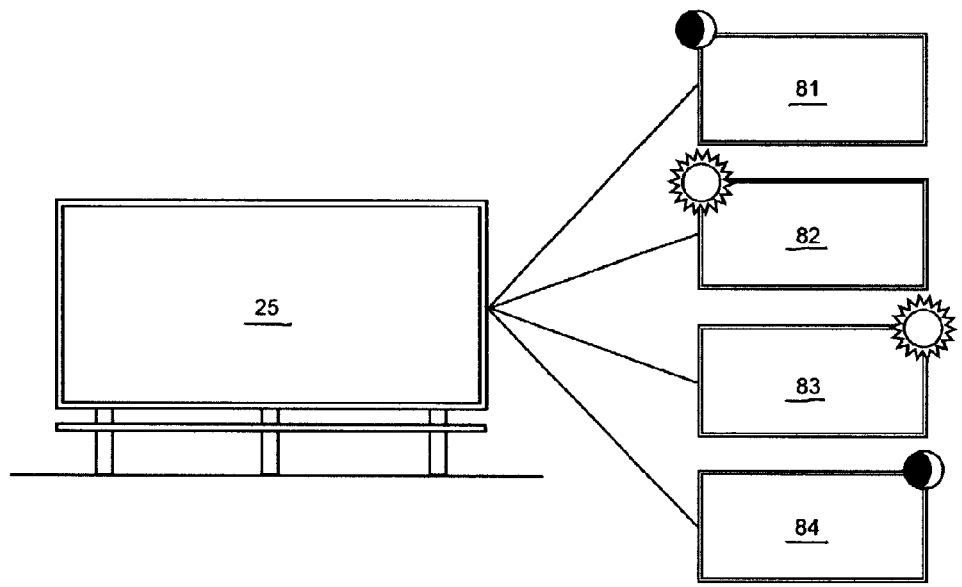
FIG. 3 is a block diagram of an advertising billboard device in accordance with the present invention.

FIG. 3 is a block diagram of a content display unit 25 in accordance with the present invention. Content display unit 25 may display dynamic-content that changes over time such as, for example, video, image morphing, sequential messages, or discrete time periods of static image. FIG. 3 illustrates an example of discrete time periods of static image. An image 81 may be displayed on content display unit 25 during the overnight period of a day, an image 82 may be displayed on content display unit 25 during the morning drive-time period of a day, an image 83 may be displayed on content display unit 25 during the afternoon drive-time period of a day, and an image 84 may be displayed on content display unit 25 during the evening period of a day. It is also contemplated that a content display unit 25 may include only a portion capable of dynamic-content display, the remainder of content display unit 25 being incapable of dynamic-content display. This would be useful, for example, for updating numeric data such as lottery numbers or the like.

Figure 4:
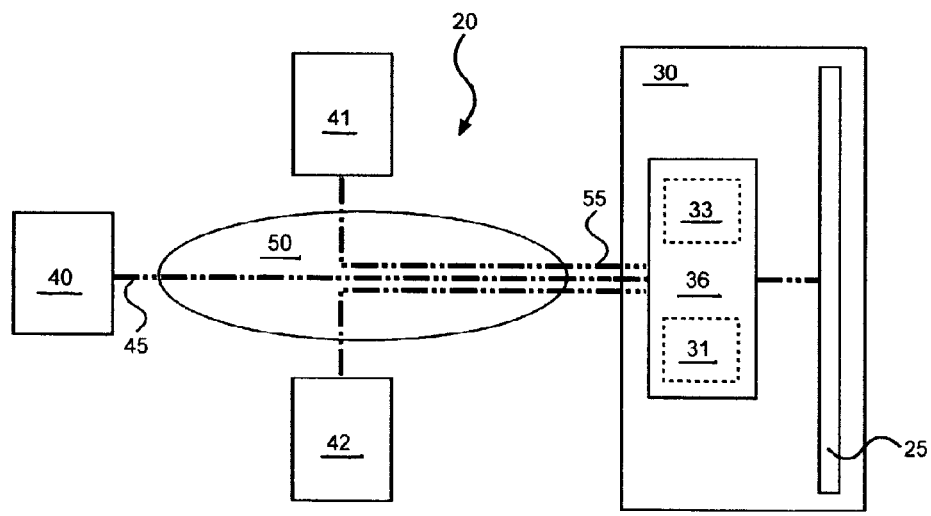
FIG. 4 is a block diagram of an advertising billboard system with a hierarchical control in accordance with the present invention.

FIG. 4 is a block diagram of an advertising billboard system 20 with a hierarchical control in accordance with the present invention. The display controller 30 may be adapted to receive, store, and display dynamic-content from a plurality of servers illustrated in FIG. 4 as server 40, a second server 41, and a third server 42. Display controller 30 comprises a hierarchical control scheme, the hierarchical control scheme adapted to select dynamic-content from one server of the plurality of servers for display on the content display unit 25. The hierarchical control scheme may be prioritized or heuristic. For example, server 40 may be a national host computer at a highest priority, second server 41 may be a regional host computer at a middle priority, and third server 42 may be a local host computer at a low priority. Since any or all servers may be transmitting dynamic-content at any time or simultaneously, the hierarchical control scheme will select which dynamic-content is displayed on content display unit 25 at any time.

Figure 5:
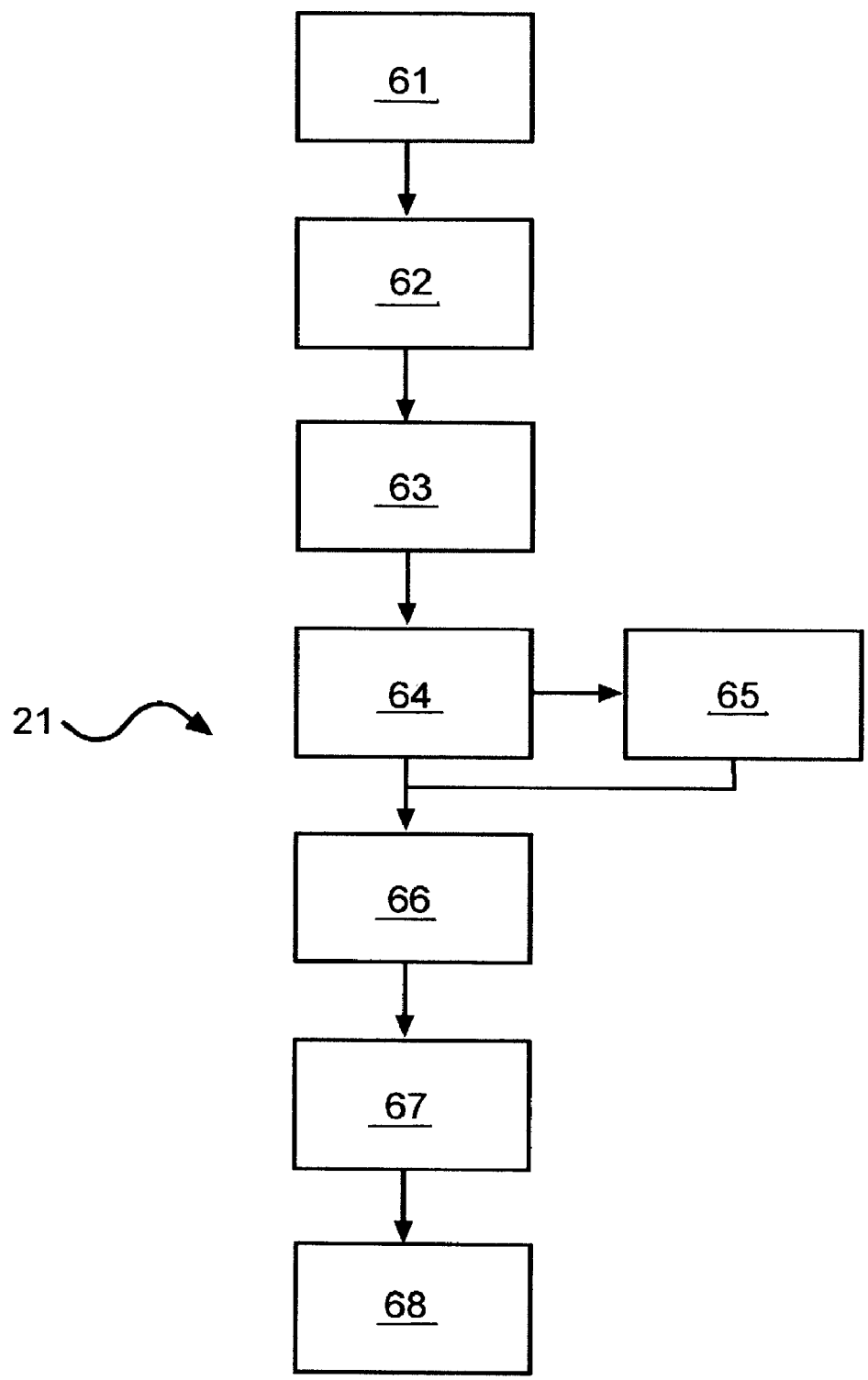
FIG. 5 is a flow chart illustrating a method of billboard advertising in accordance with the present invention.

FIG. 5 is a flow chart illustrating a method 21 of billboard advertising in accordance with the present invention. The method 21 for billboard advertising illustrated in FIG. 5 includes the following steps:

A) providing an advertising system, wherein the advertising system comprises:
at least one server;
at least one display controller, wherein the display controller is adapted to receive, store, and display dynamic-content from the server; and
at least one content display unit in communication with the display controller, wherein the content display unit visually displays the information from the dynamic-content; (illustrated as step 61)

B) receiving advertising information from an advertiser; (illustrated as step 62)

C) communicating the advertising information as dynamic-content from the server to the display controller; (illustrated as step 63)

D) displaying the advertising information on the content display unit. (illustrated as step 64) In step D, the displaying step may be divided into a plurality of time segments, allowing the step of: displaying a first advertisement during a first time segment and displaying a second advertisement during a second time segment. (illustrated as step 65)

E) segmenting a plurality of content display units into a plurality of groups, each group from the plurality of groups identified with a characteristic; (illustrated as step 66)

F) selecting a group from the plurality of groups to display dynamic-content on the plurality of content display units having the group characteristic. (illustrated as step 67) In step A, a plurality of servers may be provided, and the method may further comprise:

G) selecting a heirarchy, the heirarchy defining a prioritization of the plurality of servers to at least one of the display controllers such that the display controller selects one server from the plurality of servers. (illustrated as step 68)

Illustrations of method steps, such as, for example, the steps illustrated in FIG. 5, show steps sequentially and in a particular order. There is no need to perform the steps in the order illustrated. Deviating from the illustrated order for some or all of the steps is contemplated by the inventor, and does not depart from the scope of the present invention.

Each feature disclosed in this specification (including any accompanying claims, abstract, and drawings), may be replaced by alternative features having the same, equivalent or similar purpose, unless expressly stated otherwise. Thus, unless expressly stated otherwise, each feature disclosed is one example only of a generic series of equivalent or similar features.

While preferred embodiments of the present invention have been shown and described herein, it will be obvious to those skilled in the art that such embodiments are provided by way of example only. Numerous variations, changes, and substitutions will be apparent to those skilled in the art without departing from the invention. Accordingly, it is intended that the invention be limited only by the spirit and scope of the appended claims.

What is claimed is:

1. A method of billboard advertising comprising the steps of:
a) providing a passive content display unit, wherein said passive content display unit is configured to retain a viewable image when not being actively written to or addressed;
b) providing a display controller, wherein said display controller is configured to provide dynamic-content to said content display unit;
c) providing a plurality of servers, wherein each of said servers is in communication with said display controller, wherein each of said servers stores dynamic-content, wherein each server of said plurality of servers is configured to transmit at least a portion of its stored dynamic-content, wherein said plurality of servers comprises a first server and a second server;

d) using a hierarchy to select one server from said plurality of servers for providing dynamic-content from the selected server by the display controller to the passive content display unit, wherein the hierarchy provides a higher priority to the first server than the second server, wherein the display controller is configured to select dynamic-content transmitted from the first server over dynamic-content transmitted from the second server in accordance with the hierarchy when the first server and second server transmit content that is to be displayed at a same certain time;

e) selecting dynamic content from the selected server; and f) displaying the selected dynamic-content on said content display unit.

2. The method of claim 1 further comprising the steps of:

g) providing a plurality of content display units, each having a display controller;

h) identifying each content display unit of said plurality of content display units with a characteristic; and i) displaying dynamic-content on each of said plurality of content display units wherein said dynamic-content is different for each said characteristic.

3. The method of claim 2 further comprising the steps of:

j) providing a clock indicating a time;

k) storing a plurality of dynamic-contents; and l) changing the dynamic-content displayed on one said content display unit from a first stored dynamic-content to a second stored dynamic-content at a first time.

4. The method of claim 3 further comprising the steps of:

m) providing a camera, said camera in viewing proximity to one of said content display units; and n) taking a picture of said one content display units with said camera.

5. The method of claim 3 wherein said passive content display unit comprises GYRICON.

6. The method of claim 3 wherein said passive content display unit comprises E-INK.

7. The method of claim 1, wherein the hierarchy comprises a heuristic hierarchical control scheme.

8. A method of billboard advertising comprising the steps of:

a) providing a passive content display unit, wherein said passive content display unit is configured to retain a viewable image when not being actively written to or addressed;

b) providing a display controller, wherein said display controller is adapted to receive, store, and provide dynamic-content for said content display unit;

c) providing a plurality of servers, wherein each server of said plurality of servers is adapted to send dynamic-content to said display controller, wherein said plurality of servers comprises a first server and a second server;

d) providing a hierarchy associated with said plurality of servers, wherein the hierarchy defines a prioritization of said plurality of servers, wherein the hierarchy provides a higher priority to the first server than the second server, wherein the display controller is configured to select dynamic-content transmitted from the first server over dynamic-content transmitted from the second server in accordance with the hierarchy when the first server and second server send dynamic-content simultaneously;

e) displaying dynamic-content on said content display unit;

f) providing a clock indicating a time;

g) storing a plurality of dynamic-contents;

h) changing the dynamic-content displayed on one said content display unit from a first stored dynamic-content to a second stored dynamic-content at a first time; and i) providing a camera, said camera in viewing proximity to said passive content display unit; and j) taking a picture of said passive content display unit with said camera.

9. The method of claim 8 wherein said passive content display unit comprises GYRICON.

10. The method of claim 8 wherein said passive content display unit comprises E-INK.

11. A method for billboard advertising comprising the steps of:

a) providing an advertising system, wherein said advertising system comprises:

a plurality of servers, wherein each server of said plurality of servers is operable to transmit dynamic-content to said display controller, wherein said plurality of servers comprises a first server and a second server, one or more display controllers, wherein said one or more display controllers are adapted to receive, store, and display dynamic-content from said plurality of servers, one or more passive content display units in communication with one or more display controllers, wherein each of said one or more passive display units is configured to retain a viewable image when not being actively written to or addressed, wherein said one or more passive content display units visually displays the information from said dynamic-content, and a hierarchy associated with said plurality of servers, wherein the hierarchy defines a prioritization of said plurality of servers, wherein the hierarchy provides a higher priority to the first server than the second server, wherein the one or more display controllers are configured to select dynamic-content transmitted from the first server over dynamic-content transmitted from the second server in accordance with the hierarchy when the first server and second server transmit different dynamic-content;

b) receiving advertising information from an advertiser;

c) communicating said advertising information as dynamic-content from one or more servers of said plurality of servers to said one or more display controllers;

d) displaying said advertising information on a first passive content display unit of said one or more passive content display units; and e) associating the first content display unit with a type identifier.

12. The method of claim 11 wherein in step D, said displaying step is divided into a plurality of time segments, wherein a first advertisement is displayed during a first time segment and a second advertisement is displayed during a second time segment.

13. The method of claim 12 wherein in step A, a plurality of servers are provided, said method further comprising the steps of:

f) selecting said hierarchy from a plurality of hierarchies.

14. The method of claim 11 wherein in step D, said displaying step is divided into a plurality of time segments, wherein a first advertisement is displayed during a first time segment and a second advertisement is displayed during a second time segment.

15. The method of claim 14 wherein said first passive content display unit comprises GYRICON.

16. The method of claim 14 wherein said first passive content display unit comprises E-INK.

17. The method of claim 11 wherein in step A, a plurality of servers are provided, said method further comprising the steps of:

f) selecting said hierarchy from a plurality of hierarchies.

18. The method of claim 11, further comprising:

f) placing a global positioning system proximate to the one or more display controllers; and g) assigning a type identifier based on a location sensed by the global positioning system.

19. The method of claim 11, further comprising:

assigning a type identifier based on a location sensed by a global positioning system, wherein said global positioning system is coupled with said first content display unit.

20. The method of claim 11, wherein said type identifier represents a geographic location.

21. The method of claim 11, wherein a plurality of types of passive content display units are provided, wherein the types of passive content display units comprise one or more of a highway billboard, a moveable vehicle, and a kiosk.

* * * * *